United States Patent [19]

Russell et al.

[11] 4,031,389

[45] June 21, 1977

[54] ISOTOPE SEPARATION USING METALLIC VAPOR LASERS

[75] Inventors: Gary R. Russell; Che Jen Chen, both of Sierra Madre; Kenneth G. Harstad, Pasadena, all of Calif.

[73] Assignee: The United States of America as represented by the Administrator of the National Aeronautics and Space Administration, Washington, D.C.

[22] Filed: June 26, 1974

[21] Appl. No.: 483,301

[52] U.S. Cl. .............................. 250/283; 250/281; 250/282; 250/423 P

[51] Int. Cl.² ........................................ H01J 39/34

[58] Field of Search ....... 250/281, 282, 288, 423 P, 250/283

[56] References Cited

UNITED STATES PATENTS

| 3,294,970 | 12/1966 | Jenckel ............................. 250/423 |
| 3,443,087 | 5/1969 | Robieux ............................ 250/41.9 |
| 3,478,204 | 11/1969 | Brubaker et al. ................. 250/41.9 |
| 3,558,877 | 1/1971 | Pressman ......................... 250/41.9 |
| 3,772,519 | 11/1973 | Levy et al. ........................ 250/281 |

OTHER PUBLICATIONS

"Plasma Ionization Enhancement by Laser Line Radiation," Oettinger et al., AIAA Jour., vol. 8, No. 5, May 1970, pp. 880–885.

Primary Examiner—Alfred E. Smith
Assistant Examiner—B. C. Anderson
Attorney, Agent, or Firm—Monte F. Mott; Robert Kinberg; John R. Manning

[57] ABSTRACT

The isotope $U^{235}$ is separated from a gasified isotope mixture of $U^{235}$ and $U^{238}$ by selectively exciting the $U^{235}$ from the ground state utilizing resonant absorption of radiation from precisely tuned lasers. The excited isotope is then selectively ionized by electron bombardment. It then is separated from the remaining isotope mixture by electromagnetic separation.

16 Claims, 4 Drawing Figures

ISOTOPE SEPARATION USING METALLIC VAPOR LASERS

ORIGIN OF INVENTION

The invention described herein was made in the performance of work under a NASA contract and is subject to the provisions of Section 305 of the National Aeronautics and Space Act of 1958, Public Law 85–568 (72 Stat. 435 USC 2457).

FIELD OF INVENTION

This invention relates to an improved method and means of separating an isotope such as the isotope $U^{235}$ from an isotope mixture such as a mixture of $U^{235}$ and $U^{238}$, and more particularly to improvements therein.

As the number of nuclear power generating plants being to increase with the increasing demand for electric power and the decreasing availability of fossil fuels as well as their increased costs, the need for larger production of $U^{235}$ becomes very apparent.

Attainment of increased production by the construction of more plants, using the present day diffusion process, would require a very large expenditure of funds and natural resources. For example, the most massive plant built to date covers 74 acres, requires 500 million gallons of water daily, and cost $791 million to build. It is estimated that to build the added plant capacity, estimated as being required by 1990, using the diffusion process, an investment of 7 billion dollars (without inflation) would be required.

An alternative process to the gas diffusion process is the centrifuge process. While this latter process is not much cheaper, it uses much less electricity and thus is more attractive.

What is required is an isotope enrichment process that will be orders of magntidude lower in costs and energy consumption than either the gas diffusion or gas centrifuge process.

DESCRIPTION OF THE PRIOR ART

In a U.S. Pat. No. 3,772,519 there is described a process for separating $U^{235}$ from $U^{238}$ by applying two photon beams to a collimated beam of atoms of the two isotopes to excite and ionize the $U^{235}$ and thereafter using a magnetic field and a current pulse to separate out $U^{235}$ from the atom base. This photoionization technique is still not an efficient way to achieve isotope separation, because of the low absorption cross-section for photoionization. This implies a very long absorption length and a high laser intensity for obtaining sufficiently fast ionization. Photoionization is also described in a U.S. Pat. No. 3,443,087.

OBJECTS AND SUMMARY OF THE INVENTION

An object of this invention is to provide a method and means of isotope separation that is more economical than present day techniques.

Another object of this invention is to provide a method and means of isotope enrichment which is simpler than present day techniques.

Yet another object of this invention is to provide a method and means of isotope enrichment which is more efficient and produces a greater yield than achievable by present day techniques.

Still another object of this invention is to provide a novel and improved method and means of isotope enrichment.

These and other objects of this invention may be achieved by vaporizing an isotope mixture, such as uranium, powder using a hot inert gas such a helium. The vapor temperature is selected as sufficiently high to provide the required vapor density in a laser absorption and separation region. A supersonic flow of the gas-vapor mixture is then induced through an expansion nozzle.

Because of the relatively low saturation pressure resulting when the gas-vapor mixture passes through the expansion nozzle a supersaturated vapor such as uranium vapor is produced. The supersaturated vapor is then irradiated by a series of light pulses produced by several lasers whose wavelengths are selected to selectively excite the atoms of a particular isotope, such as $U^{235}$, to an energy level from which the aoms can be selectively ionized by bombardment by free electrons.

The free electrons may result from the equilibrium ionization of the vapor during heating or may be produced by an electrical discharge upstream of the laser absorption region. A combined magnetic and electric field is then used to separate the ions, such as $U^{235}$ ions, from the remainder of the vapor, by depositing the atoms of the particular isotope on a suitable collector plate.

The novel features that are considered characteristic of this invention are set forth with particularity in the appended claims. The invention will best be understood from the following description when read in connection with the accompanying drawings.

DESCRIPTION OF AN EMBODIMENT OF THE INVENTION

Figure 1:
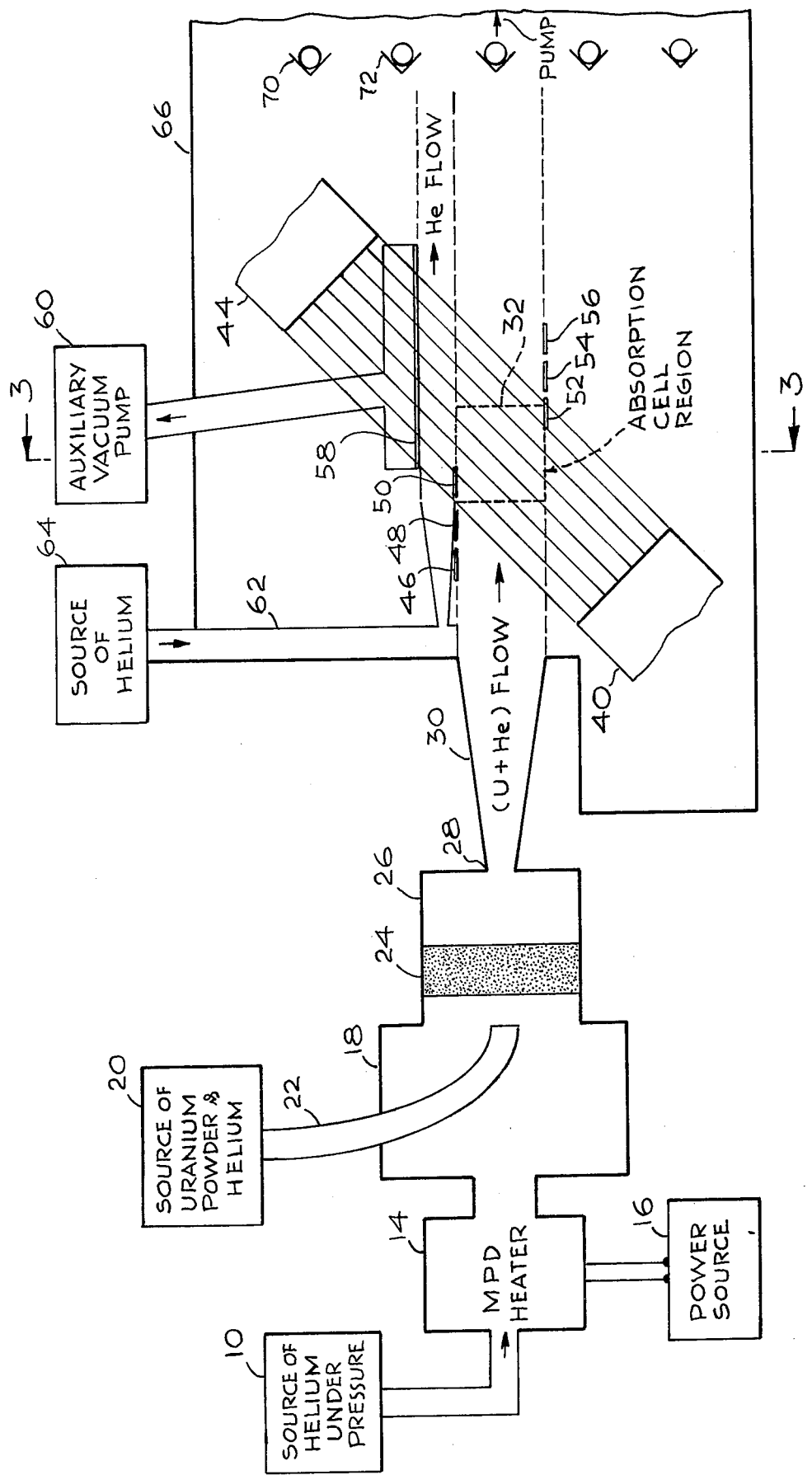
FIG. 1 is a schematic and sectional diagram of an embodiment of the invention.

FIG. 1 is a schematic view, in section, of an embodiment of the invention. Helium gas under pressure, from a source 10, is heated to a temperature on the order of 10,000° K, by introducing it into a heater, such as a magnetoplasmadynamic heater, (MP D)14. Power for the MPD heater is provided by a source 16. MPD heaters are well known to those skilled in the plasma heating art. An article describing an MPD is "Influence of Pressure and Current on the Thermal Efficiency of an MPD Arc Operating Without an Applied Magnetic Field" by Pivirotto, T. J., found in the AIAA JOURNAL (SYNOPTIC). Vol. 11 No. 1 - Jan. 1973 - pages 12–13. The hot helium gas next enters a mixing chamber 18, where it is mixed with, and heats up, a uranium powder. The uranium powder, which is a mixture of $U^{235}$ and $U^{238}$, is supplied to the chamber from a source 20 through a pipe 22. It may be carried into the chamber using helium gas.

The uranium powder-helium gas mixture, next flows through a hot, packed bed vaporizer 24, which serves to vaporize the uranium powder so that at its output ide there is provided a vapor-gas mixture. The packed bed vaporizer may constitute chips of tungsten, for example, which may be heated by the hot gas, or by an auxiliary power source, (not shown), if desired. By way of example, the temperature of the vapor-gas mixture is raised by 2,800° K.

The temperature to which the vapor-gas mixture is raised, is selected to produce adequate vaporization together with some ionization, but not to too great a degree, of the isotope mixture. Thus, free electrons are created with vapor-gas mixture, which then passes into a stagnation chamber 26. The vapor-gas mixture is then allowed to expand through an aerodynamic throat 28 and supersonic nozzle 30 at a speed approaching Mach 3. This velocity is obtained by having the helium obtained from the source 10 at a high enough pressure. The expanded mixture causes a supersaturated uranium vapor to be produced, which passes into an absorption cell region 32.

Figure 2:
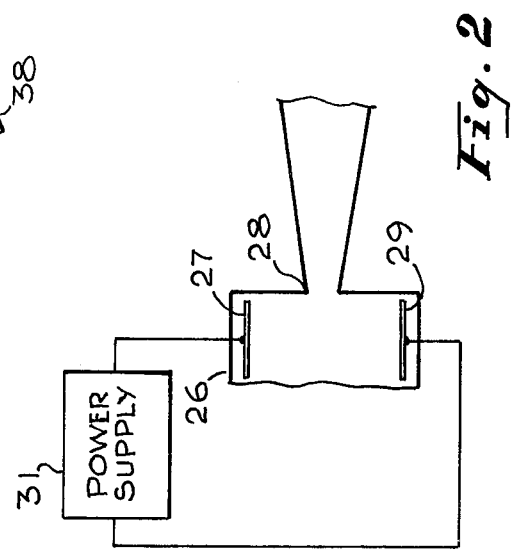
FIG. 2 is a sectional fragmented view showing free electrons may be created by an electric discharge in the stagnation chamber.

The initial free electron density in the absorption region is adequate to selectively ionize the excited $U^{235}$ atoms, but is low enough so that the accompanying $U^{238}$ ion density is much smaller than the $U^{235}$ density. If the equilibrium ionization in the stagnation chamber 26 is somewhat too large, lower ionization is attained by utilizing a relatively long nozzle and a large buffer gas ratio, which enables some recombination to take place before the absorption cell 32 is reached. However, the nozzle cannot be made so long that condensation occurs or viscous effects dominate the supersonic expansion. If the initial free electron density is too small, a weak electrical discharge upstream of the absorption region 32 can provide the necessary ionization. By way of example, a vapor-gas mixture temperature of 2,800° K in the stagnation chamber provides adequate initial ionization without such a discharge. If a weak electrical discharge is required to produce free electrons, this may be done in the manner shown in FIG. 2 which is a fragmented view of the stagnation chamber 26. Electrodes 27, 29 are spaced apart in the chamber and a potential is applied to them from a source 31, sufficient to cause a weak electrical discharge in the gas-vapor-mixture and some free electrons.

Figure 3:
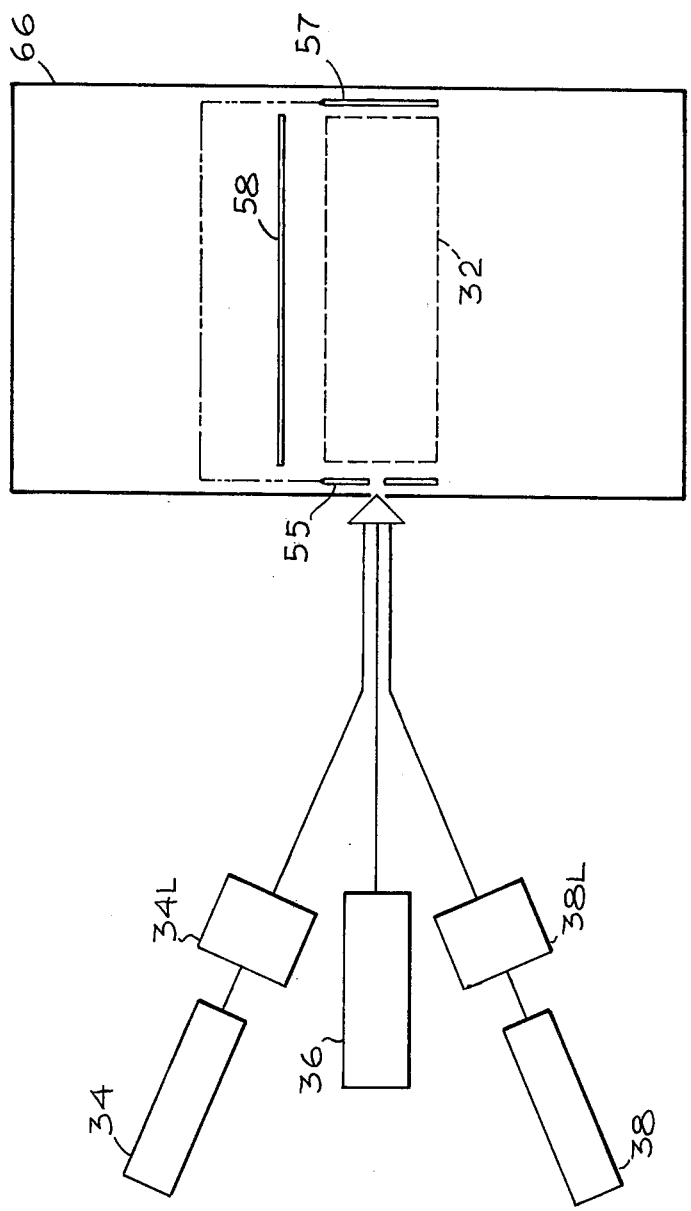
FIG. 3 is a schematic and sectional view along the lines 3—3 in FIG. 1, illustrating the placement of lasers and the absorption cell in the embodiment of the invention, when the invention is viewed from the right or downstream side.

In the absorption cell region 32, the vapor is irradiated through a window, by laser light pulses from tuned lasers, respectively 34, 36, 38 and dye laser cells 34L, 38L, which selectively excite the $U^{235}$ atoms present, and successively raise their energy levels to a state at which they can be selectively ionized by bombardment by the free electrons which are present as a result of the previous slight ionization. This may be seen in FIG. 3, which is a view from the downstream side of the invention, of only the lasers, absorption cell and associated electrodes. The $U^{235}$ ions are separated out of the gas-vapor mixture by means of an electric and a magnetic field. Two magnet pole pieces, respectively 40, 44, partially shown, provide a magnetic field passing through the absorption cell region and having a strength, by way of example, of 100 gauss. The magnetic field is steady state and may be obtained using an electromagnet, for example. The electric field is obtained by way of example, by providing electrodes 46, 48, 50, spaced displaced downstream from which are electrodes 52, 54, 56. The electric field electrodes are spaced apart by the width of the vapor-gas stream flowing out of the supersonic nozzle and are longitudinally displaced to establish a field at right angles to the magnetic field and passing through the absorption cell region. The electric field is established by voltages induced on the electrodes by reason of the rapidly flowing ions passing therebetween. Two other electrodes 55, 57, shown in FIG. 3, are placed on either side of the absorption cell and are electrically connected together. Electrode 55 has a hole in it to enable light to pass therethrough.

The $U^{235}$ ions are deflected to subsequently follow the magnetic field lines and are deposited onto an ion collector plate 58 which is placed within the magnetic field. The plate is parallel to both the laser beam axis and the flow director.

In order to prevent $U^{238}$ in the vapor-gas mixture from diffusing onto the collection plate 58, a sheath of cold helium gas is blown across it, in the direction of the vapor-gas streamflow, from a tube 62, which is connected to a source 64. The helium flow density is low enough to permit the high velocity $U^{235}$ ions to pass therethrough, but high enough to prevent the terminal flow of $U_{238}$ atoms from passing therethrough. The ion collector plate is made porous and a slight vacuum is drawn therethrough by means of an auxiliary pump 60. This asists in holding the cold helium gas sheath on the ion collector plate. The collector plate may be periodically removed so that the $U^{235}$ may be recovered, or it may be slowly rotating or a rotatable, plate which extends outside of the housing envelope walls 66, with provision being made to remove the $U^{235}$ from the portion of the plate extending outside of the envelope. Downstream of the absorption cell, a pump, not shown, maintains a suitable vacuum within the walls 66. Water cooled condenser baffles 70, 72, for example, condense the uranium which has passed through the absorption cell region.

Figure 4:
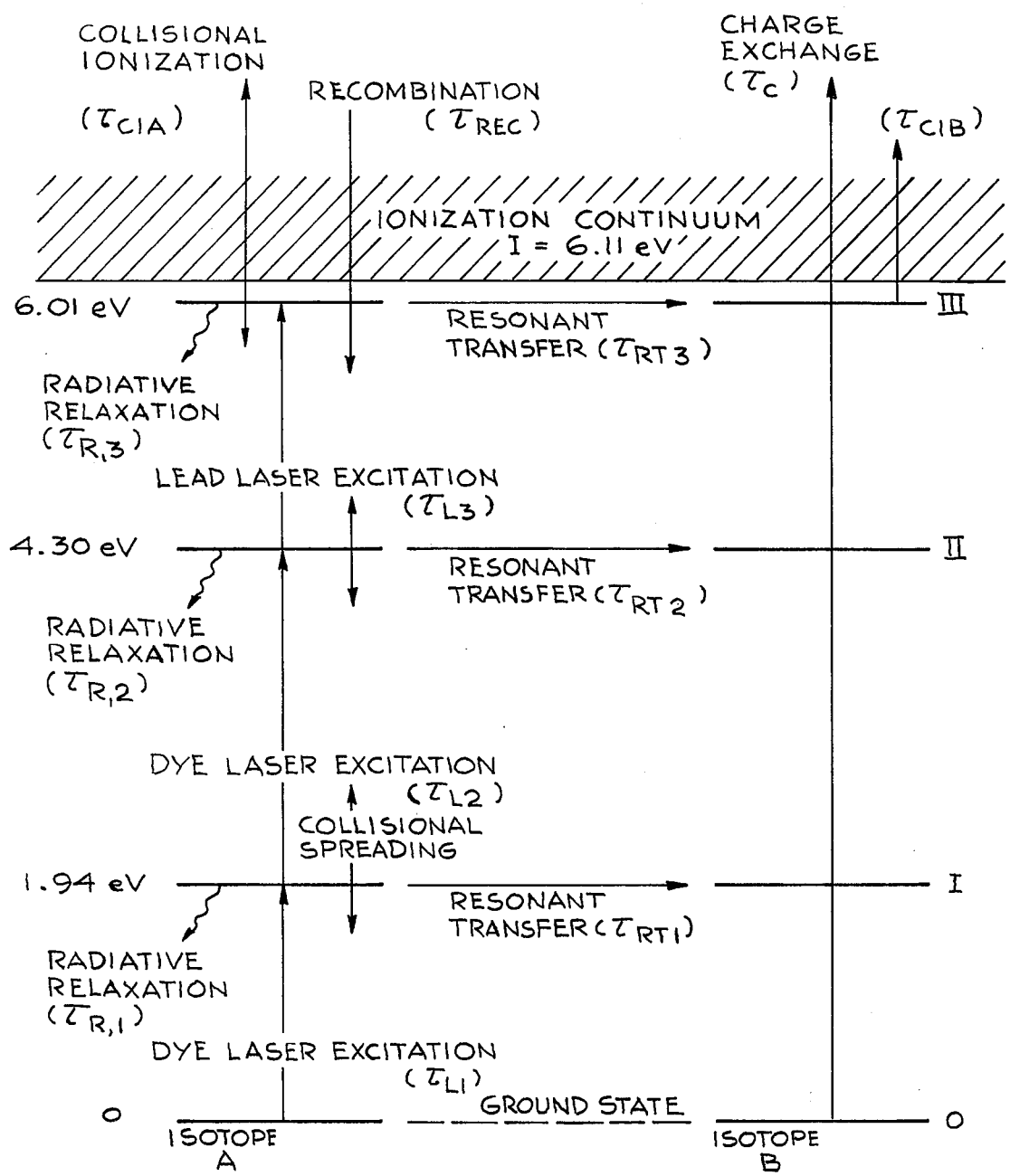
FIG. 4 is an energy level diagram, shown to assist in an understanding of this invention.

Because of the difference in atomic weights between $U^{235}$ and $U^{238}$, there is a 0.1 Angstrom difference between the wavelength of light required to raise a molecule of $U^{235}$ to its elevated excited state and that required to raise the $U_{238}$ molecule to its excited state. Advantage of this is taken, in accordance with this invention, by using the copper chloride laser 34 and specifically converting its light output to the required light wavelength, by pumping a dye laser cell 34L, which can contain a dye, such as rhodamine 6G, which radiates the proper wavelength of light. As shown in FIG. 4, this will selectively raise the energy level of the atom $U^{235}$ to a first energy level which is 1.94 eV. The second copper chloride laser 38, also excites a dye laser cell 38L, similar to dye laser cell 34L, the light output from which serves to selectively excite the already excited atoms of $U^{235}$ to a second energy level at 4.30 eV.

A copper chloride laser and a lead chloride laser of a type suitable for use with this invention, are described respectively in articles by Chen, Nerheim and Russell, entitled, "Double-discharge Copper Vapor Laser with Copper Chloride as a Lasant," and published in APPLIED PHYSICS LETTERS, Volume 23, No. g, November, 1973, pages 514 and 515, and in another article by Chen, "Lead Lasers Using Lead chloride as a Lasant," to be published in the JOURNAL OF APPLIED PHYSICS.

The lead laser 36 supplies light at a frequency which will raise an atom of $U^{235}$ from 4.3 eV to a third energy level at 6.01 eV. When raised to the third level, the level spacing to the ionization continuum (0.1 eV) is so small that electron-atom collisions rapidly cause spreading above and below the third laser excited level.

Also, this band of lines can be depopulated by electron-atom excitation into the ionization continuum.

At each level of laser excitation the laser absorption must transfer that level population to the next laser excitation level faster than losses occur at that level. In addition, in the last step, the collisional rate of ionization at the third level must be faster than the loss mechanism at that level. The losses at each level are caused by resonant transfer, radiative relaxation and collisional spreading, as shown in FIG. 4. Finally, the separation of ions must occur faster than charge exchange and electron-ion recombination.

The lasers which are used are pulsed simultaneously at continuous pulsing rates, by way of example, of $10^4$ Hz and laser pulse widths of about 25 n sec.

The high velocity at which the gas-vapor mixture is passed through the absorption cell insures that a large quantity of the product can be processed within a short period of time within a compact space thus obtaining a high output or yield while conserving space. For a continuous operation basis, arrays of absorption cells and magnetic separators can be supplied by a central source of uranium vapor and a central source of laser energy. The high velocity gas-vapor used in this invention also causes a resulting high ion flux compared to the thermal flux of $U^{238}$, resulting in improving the quality of separation, especially if the helium sheath is used with the collector plate.

The laser separation scheme described herein can also be used for separating isotope mixtures other than uranium, provided that the isotope shift is large enough to attain laser excitation discrimination between various isotopes. This means that the line broadening cannot be large; the pressure and temperature used in the separation process must be relatively low, and the atomic mass should be relatively large.

For elements in the solid phase at standard conditions, there are three additional restrictions. The temperature required for vaporization of the isotope mixture cannot be so large that high temperature materials such as graphite and tungsten cannot be used in the fabrication of the isotope heater. In addition, there must be a balance between the binding energy for vaporization and the atomic ionization potential such that the temperatures required to produce a sufficient amount of vapor does not also produce too great a degree of ionization of the isotope mixture. Finally, the pressure must be low enough in the supersonic expansion that no condensation of the vapor takes place.

The effect of the ionization potential on the selective multiple laser excitation process is not very important although it can affect the separator efficiency. Since there are a growing number of metallic vapor lasers capable of operation over a wide range of wavelengths in the visible, an adequate mixture of dye lasers and metallic vapor lasers can be provided which will allow the last excitation step into the ionization continuum to be accomplished by collisional ionization.

There has accordingly been described and shown a novel, useful, efficient and inexpensive system for separating $U^{235}$ from a mixture of $U^{235}$ and $U^{238}$.

Although particular embodiments of the invention have been described and illustrated herein, it is recognized that modifications and equivalents may readily occur to those skilled in the art and consequently, it is intended that the claims be interpreted to cover such modifications and equivalents.

The embodiments of the invention in which an exclusive property or privilege is claimed are defined as follows:

1. A method of separating a first isotope from a mixture of a first and second isotope comprising
   heating a mixture of said first and second isotopes to a temperature at which they are vaporized and some free electrons are produced,
   passing said vaporized isotopes with free electrons therein at a supersonic speed through an expansion nozzle to expand into a supersaturated vapor,
   applying laser light having a predetermining frequency to said supersaturated vapor to selectively elevate the energy level of said first isotope to an energy level at which said first isotope atoms are ionized by said free electrons, and
   directing said ionized atoms to a collection plate.

2. A method as recited in claim 1 wherein said step of heating said mixture until it is vaporized and some free electrons are produced comprises
   heating an inert gas to a temperature at which said mixture vaporizes,
   mixing said mixture with said inert gas to form a second mixture, and
   passing said second mixture through a vaporizing bed to cause said mixture in said second mixture to vaporize.

3. A method as recited in claim 1 wherein said first isotope is $U^{235}$ and said second isotope is $U^{238}$.

4. A method as recited in claim 1 wherein there is included the step of directing a stream of inert gas across a surface of said collection plate to prevent atoms which are not ionized from being collected by said collection plate.

5. A method as recited in claim 1 wherein said step of directing said ionized atoms to a collection plate comprises applying a magnetic and electric field to said ionized atoms to direct them to said collection electrode.

6. Apparatus for separating one isotope from a mixture of isotopes comprising
   means for vaporizing said isotope mixture,
   means for producing some free electrons in said vaporized isotope mixture,
   means for expanding said vaporized isotope mixture at a supersonic speed to form a high velocity stream,
   laser means for selectively and successively elevating the energy level of atoms of said one isotope within said vaporized isotope mixture to a level at which said atoms of said one isotope are ionized by said free electrons,
   means for passing said high velocity stream through said means for selectively elevating to provide ionized atoms of said first isotope,
   a collection plate, and
   means for establishing a field for deflecting said ionized atoms onto said collection plate to thereby be removed from said vaporized isotope mixture.

7. Apparatus as recited in claim 6 wherein said mixture of isotopes is a mixture of $U^{235}$ and $U^{238}$, and said one isotope is $U^{235}$.

8. Apparatus as recited in claim 6 whereinsaid means for vaporizing said isotope mixture and said means for producing some free electrons comprises
   a source of an inert gas,
   means for heating gas from said source to a temperature at which said mixture will vaporize, means for mixing said isotope mixture with said hot gas to form a gas-iostope mixture, a vaporizing bed, and means for passing said gas-isotope mixture through said vaporizing bed to vaporize said isotope mixture and to ionize some atoms of said isotopes to provide some free electrons.

9. Apparatus as recited in claim 6 wherein said laser means for selectively elevating the energy level of atoms of said one isotope to a level at which said atoms are ionized by said free electrons comprises laser means for generating light beams at a wavelength which will selectively energize said first isotope atoms, and means for directing said light beams at said vaporized isotope mixture.

10. Apparatus as recited in claim 6 wherein said laser means comprises a plurality of copper chloride lasers and a lead laser.

11. Apparatus as recited in claim 6 wherein said means for producing some free electrons in said vaporized isotope mixture includes spaced electrode means within said vaporized isotope mixture for establishing an electric arc discharge.

12. Apparatus as recited in claim 6 wherein said collection plate is porous, and there is included pump means connected to the surface of said collection plate opposite to the surface which collects ionized atoms for drawing a vacuum through said collection plate, and means for blowing an inert gas stream across the surface of said collection plate which collects ionized atoms and prevents atoms which are not ionized from reaching said surface.

13. Apparatus as recited in claim 6 wherein said means for establishing a field for deflecting said ionized atoms onto a collection plate comprises magnetic means for establishing a magnetic field passing through the region where the atoms of said one isotope have their energy levels elevated and then are ionized by said free electrons, and electrode means for establishing an electric field which intersects at an angle with said magnetic means at said region.

14. Apparatus for separating a first isotope from a mixture of a first and a second isotope comprising a source of a hot inert gas at a temperature at which said isotope mixture will vaporize and produce some free electrons, means for mixing said isotope mixture with said hot inert gas to form a gas-isotope mixture, a vaporizer bed, means for passing said gas-isotope mixture through said vaporizer bed to establish a gas-isotope vapor mixture having some free electrons therein, means for expanding said gas-isotope vapor mixture with said free electrons therein at a supersonic speed to form a gas-isotope vapor stream, laser means for generating pulses light beams having a wavelength which will selectively and successively elevate the energy level of the atom of said first isotope in said gas-isotope vapor mixture to an energy level at which they can be ionized by said free electrons, means for directing said pulsed light beams at said gas-isotope vapor streams, and means for separting said ionized atoms from the remainder of said mixture.

15. Apparatus as recited in claim 14 wherein said laser means comprises two copper chloride lasers and a lead laser.

16. Apparatus as recited in claim 14 wherein said means for separating said ionized atoms from the remainder of said mixtures includes a collection plate positioned adjacent said gas vapor stream a spaced pair of magnetic pole means between which said gas-isotope vapor mixture including said ionized first isotope atom pass, for establishing a magnetic field which deflects said ionized atoms onto said collection electrode, and a spaced pair of electrode means between which said gas-isotope vapor mixture including said ionized first isotope atoms pass, for establishing an electric field which deflects said ionized atoms onto said collection electrode, a source of cool inert gas means for directing gas from said source of cool inert gas across the ionized atom collecting surface of said collection plate for preventing collection thereby of any atoms of said gas-vapor mixture which are not ionized.

* * * * *